(12) United States Patent
Blayvas et al.

(10) Patent No.: US 9,071,737 B2
(45) Date of Patent: *Jun. 30, 2015

(54) IMAGE PROCESSING BASED ON MOVING LENS WITH CHROMATIC ABERRATION AND AN IMAGE SENSOR HAVING A COLOR FILTER MOSAIC

(71) Applicant: Broadcom Corporation, Irvine, CA (US)

(72) Inventors: Ilya Blayvas, Holon (IL); Konstantin Kraimer, Hadera (IL)

(73) Assignee: Broadcom Corporation, Irvine, CA (US)

( * ) Notice: Subject to any disclaimer, the term of this patent is extended or adjusted under 35 U.S.C. 154(b) by 160 days.

This patent is subject to a terminal disclaimer.

(21) Appl. No.: 13/777,022

(22) Filed: Feb. 26, 2013

(65) Prior Publication Data

US 2014/0240548 A1  Aug. 28, 2014

Related U.S. Application Data

(60) Provisional application No. 61/768,031, filed on Feb. 22, 2013.

(51) Int. Cl.
  H04N 5/217    (2011.01)
  H04N 5/232    (2006.01)
  H04N 5/357    (2011.01)
  H04N 9/04     (2006.01)

(52) U.S. Cl.
  CPC ......... *H04N 5/217* (2013.01); *H04N 5/23212* (2013.01); *H04N 5/3572* (2013.01); *H04N 9/045* (2013.01)

(58) Field of Classification Search
  CPC ... H04N 5/2254; H04N 5/2321; H04N 9/045; H04N 2209/046; H04N 5/23212; H04N 5/217; H04N 5/3572; H04N 5/265; G02B 7/28
  See application file for complete search history.

(56) References Cited

U.S. PATENT DOCUMENTS

| | | | |
|---|---|---|---|
| 8,878,968 B2 * | 11/2014 | Blayvas | 348/272 |
| 2007/0187572 A1 * | 8/2007 | Subbotin | 250/201.7 |
| 2008/0239088 A1 * | 10/2008 | Yamashita | 348/222.1 |
| 2010/0315541 A1 * | 12/2010 | Egawa | 348/294 |
| 2013/0010163 A1 * | 1/2013 | Yamaguchi | 348/242 |
| 2013/0057753 A1 * | 3/2013 | Gillet et al. | 348/349 |

* cited by examiner

*Primary Examiner* — Luong T Nguyen
(74) *Attorney, Agent, or Firm* — McDermott Will & Emery LLP (57) ABSTRACT

Embodiments of imaging devices of the present disclosure correct chromatic aberrations present in color images obtained from an image sensor having a color filter mosaic based on a series of several images taken at different focal positions of an optical imaging lens possessing uncorrected chromatic aberration(s).

20 Claims, 11 Drawing Sheets

| | PN 520 | |
|---|---|---|
| PW 550 | P 510 | PE 530 |
| | PS 540 | |

IMAGE PROCESSING BASED ON MOVING LENS WITH CHROMATIC ABERRATION AND AN IMAGE SENSOR HAVING A COLOR FILTER MOSAIC

CROSS-REFERENCE TO RELATED APPLICATIONS

This application claims the benefit of a U.S. provisional application entitled, "IMAGE PROCESSING BASED ON MOVING LENS WITH CHROMATIC ABERRATION AND AN IMAGE SENSOR HAVING A COLOR FILTER MOSAIC," having Ser. No. 61/768,031, filed Feb. 22, 2013, which is entirely incorporated herein by reference.

BACKGROUND

In conventional color digital imaging, a pixel color value is detected due to a color mosaic deposited on a surface of an image sensor, which is known in the art as the Bayer mosaic. The use of the Bayer mosaic for color separation results in different colors being detected in different pixels of the image sensor and, therefore, different points of the captured image, which results in color aliasing. Color aliasing is a phenomenon in which the colors of the fine details of the image are distorted, or false colors are detected along the edges and fine details of the image.

To decrease the phenomenon of color aliasing, an optical low-pass filter (OLPF) is usually added to a digital camera. This filter partially blurs the image, decreasing the color aliasing phenomenon, but simultaneously decreasing the image resolution. Furthermore, the OLPF is usually based on polarizing properties of optical birefringence materials and fails to properly work under the conditions of polarized illumination, thereby limiting use of polarization techniques and degrading the image quality under the polarized illumination.

Furthermore, in conventional digital cameras, the image formed on the image sensor should be simultaneously sharp for all the colors of the spectrum. Therefore, great efforts are taken to correct the chromatic aberrations of the lenses, which is an intrinsic property of glass lenses. However, correction of chromatic aberrations results in significantly more expensive, bigger and bulkier lenses, and degradation of other optical properties, such as a significant decrease of maximum aperture, an increase of the minimal focal length, etc.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

This disclosure provides systems and methods for automatically utilizing sequential image captures synchronized with lens movement in an image processing pipeline of an imaging device such as, for example a digital stills or video camera, to correct chromatic aberrations and/or color aliasing. Embodiments in accordance with the present disclosure capture several exposures at multiple focal lengths and use image signal processing to overcome problems of chromatic aberrations and/or color aliasing.

Therefore, to acquire image data, a digital imaging device may include an image sensor that provides a number of light-detecting elements (e.g., photo-detectors) configured to convert light detected by the image sensor into an electrical signal. In accordance with embodiments of the present disclosure, the image sensor may include a color filter mosaic or array in order to capture color information.

Furthermore, the disclosed system uses an optical imaging lens with uncorrected chromatic aberration(s). Note, refractive materials used to build optical lenses (glass and transparent plastics) naturally have color dispersion (dependence of refractive coefficient on the light wavelength) and great efforts are usually taken to overcome lens chromatic aberrations. As it is known by one skilled in the art, relaxing the requirement of absence of chromatic aberrations (i.e. allowing the lens to possess the uncorrected chromatic aberration) results in significant improvements of other optical properties (e.g., increase of the maximum aperture, decrease of the minimum possible focal length, decrease of lens size, weight, price, etc.).

Chromatic aberrations in the lenses are usually corrected by using additional negative (concave) lenses with high dispersion. Relaxing the necessity of achromatic optics results in simpler, cheaper, lighter and smaller optics with drastically better other optical properties. For instance, the minimal focus length can be reduced, and the maximal aperture increased by a factor of two or more—all these while reducing the price and complexity of the optical system.

In accordance with embodiments of the present disclosure, a sequence of sub-frames is captured at different focal positions of the optical imaging lens, while the lens is swept in the range of preliminary defined relevant positions. These sub-frames will correspond to the sweep over different wavelengths and different distances to the object in a scene being captured. Images taken at different focal lengths corresponding to a specific color in focus will have other colors defocused due to chromatic aberration. This information is used in processing the acquired sequence of sub-frames to combine exposures to overcome the problem of false colors and color aliasing while maintaining maximum spatial resolution. By not using negative lens to correct chromatic aberrations, one of ordinary skill in the art can estimate that the maximum aperture of optical systems can be increased by at least a factor of ×2, thereby increasing the amount of light and camera low-light sensitivity by at least a factor of ×4.

Figure 1:
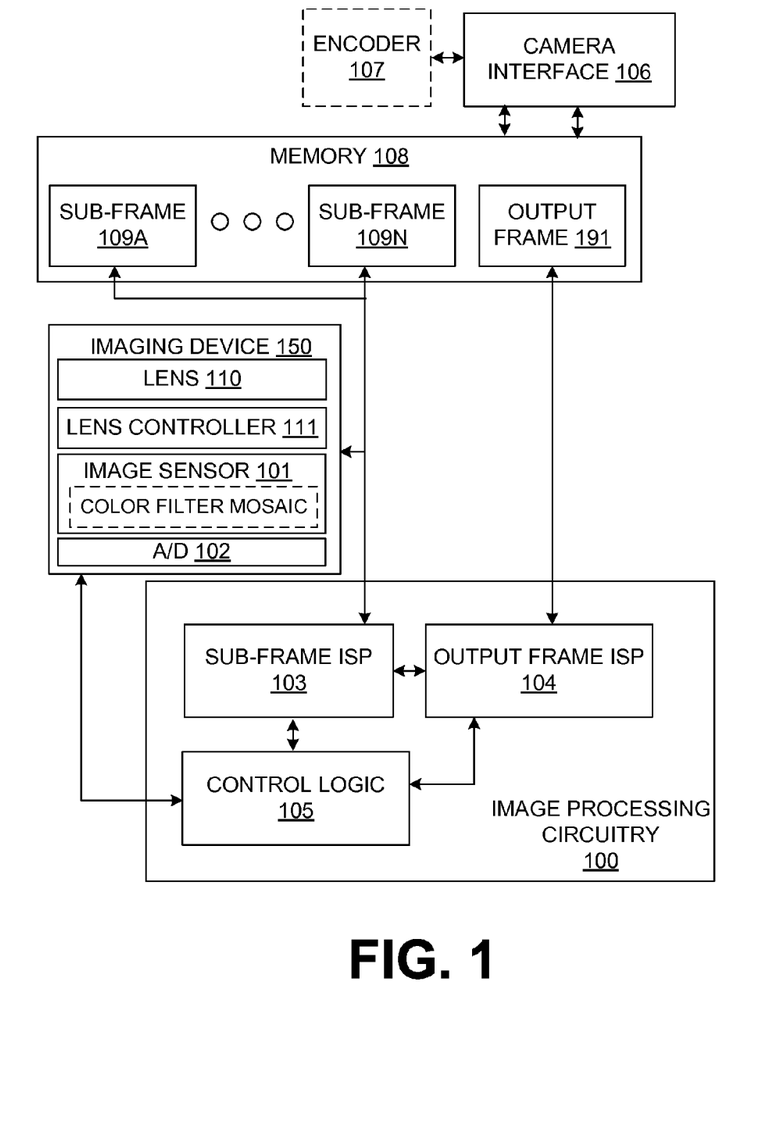
FIG. 1 is a block diagram of one embodiment of an imaging device having image processing circuitry according to the present disclosure.

Referring to FIG. 1, a block diagram of one embodiment of an image processing circuitry 100 is shown for an imaging device 150. The illustrated imaging device 150 may be provided as a digital camera configured to acquire both still images and moving images (e.g., video). The imaging device 150 may include an optical imaging lens 110, a lens controller 111, an image sensor 101, and analog to digital (A/D) converter 102. Internal filters may be employed to block ultraviolet and infrared wavelengths, limiting transmittance spectrum to the visible wavelengths such as between 400 nm and 700 nm, or thereabouts.

The lens controller 111 is configured to adjust at least the focal position of the lens 110. As a non-limiting example, the lens controller 111 may include a sonic coil actuator, a piezoelectric actuator, and/or other type of motor as can be appreciated. The image sensor 101 may be configured to capture and convert light into electrical signals. Also, the image sensor 101 may include a CMOS (complementary metal-oxide-semiconductor) image sensor (e.g., a CMOS active-pixel sensor (APS)), a CCD (charge-coupled device) image sensor, or other type of image sensor as can be appreciated.

In a digital imaging system, the image sensor 101 may consist of an array of photo-detectors (pixels), such that the image sensor 101 forms a focal plane for the lens 110 and captures the image of an object. The image sensor 101 may include a color filter array or mosaic (e.g., a Bayer filter) and may thus provide both light intensity and wavelength information captured by each imaging pixel of the image sensor 101 to provide for a set of raw image data that may be processed by image processing circuitry 100.

To obtain a color image, image sensor 101 acquires images at several different lens positions. In particular, each lens position corresponds to specific wavelength that will form a sharp image at a given distance to the object for a specific color. This constraint, together with cutting out of infrared and ultraviolet parts of the transmittance spectrum allows for obtaining the color signature for each color component of each pixel, and then reconstructing the object distance for each image pixel.

In some embodiments, the image processing circuitry 100 may include various subcomponents and/or discrete units of logic that collectively form an image processing "pipeline" for performing each of various image processing steps. Although the subcomponents are shown as image signal processors (ISPs), the function of the subcomponents may be implemented using other hardware (e.g., digital signal processors (DSPs) or application-specific integrated circuits (ASICs)), software, or via a combination of hardware and software components. The various image processing operations may be provided by the image processing circuitry 100.

The image processing circuitry 100 may include sub-frame ISP(s) 103, an output frame ISP 104, and control logic 105, among others. The analog image signals captured by the image sensor 101 are passed to an analog-to-digital (A/D) converter 102 for conversion into binary values that can be processed by the sub-frame ISP 103. Control logic 105 of a main CPU or processor controls and regulates operation of the imaging device 150.

In one embodiment, the optical imaging lens 110 forms an image on the image sensor 101, and the image is acquired by the image sensor 101, digitized by the A/D converter 102, and transmitted to the sub-frame ISP 103, where it is further processed and stored in memory 108. In particular, the lens position is swept through a focus range, and during the position sweep, multiple sub-frames images are taken, processed by sub-frame ISP 103, and stored in the memory 108. As such, in one embodiment, during acquisition of N sub-frames, the lens 110 periodically moves through its entire focus range, therefore each of the N sub-frames is acquired at its specific focal distance.

After finishing the focus sweep, the output frame ISP 104 processes the set of sub-frames 109A-N from memory 108, finds the color signatures of color components of the pixels, and from the color signatures, calculates the distance to the object in the captured scene for each pixel color component. Therefore, by foregoing the correction of chromatic aberration in the optics and by capturing plural imperfect images in short intervals at different positions of the optical lens, the sharpest pixel color components are determined and used to obtain an optimal image.

Figure 11:
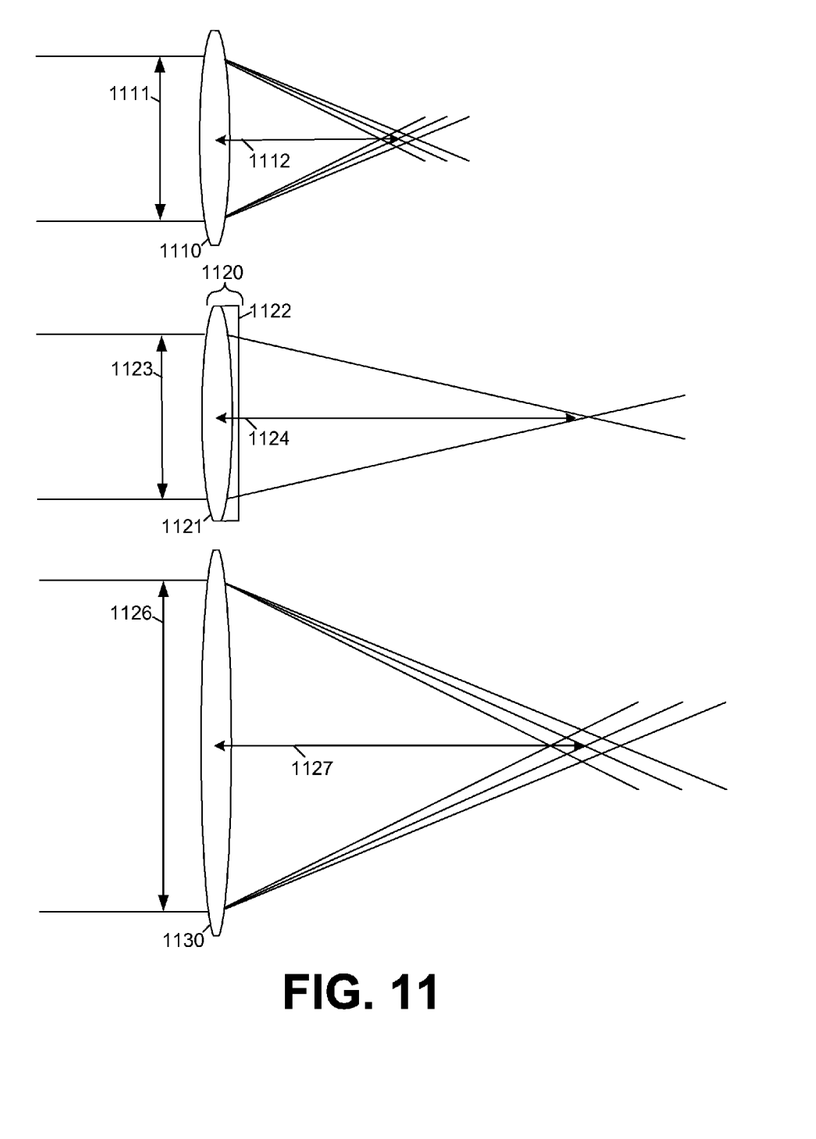
FIG. 11 is a diagram illustrating optical advantages of lenses without correction of chromatic aberrations in accordance with embodiments of the present disclosure.

Further, by not attempting to correct for chromatic aberrations in the optics, a negative lens is not added to the optics which does not reduce optical and focusing power and does not add to complexity and cost. Therefore, the optical lens of the present disclosure has improved optical power due to increased aperture size for the equivalent focal distance. For instance, lenses can be designed with an aperture of f/0.7 in accordance with the present disclosure, where an equivalent chromatically corrected lens at the same focal distance would necessarily have an aperture of f/1.4, as illustrated in FIG. 11.

Further, in a particular mode of operation, an embodiment of the output frame ISP 104 may compile a depth map of the scene based upon the sub-frames 109a-N from which the output frame 191 is assembled. To this end, each pixel or other portion of the output image 191 is selected from a particular one of the sub-frames 109a-N where the pixel is the sharpest. Since each one of the sub-frames 109a-N is indexed and corresponds to a specific focal distance, the distance between the imaging device 150 and the portion of the scene represented in the pixel may be determined based upon the particular one of the sub-frames 109a-N used to "best" represent the pixel (i.e. the sharpest). In some embodiments, interpolation may be used to determine the distance to each pixel or other portion of the output frame 191 with a higher accuracy than may be determined based upon the focal distance alone.

Figure 2:
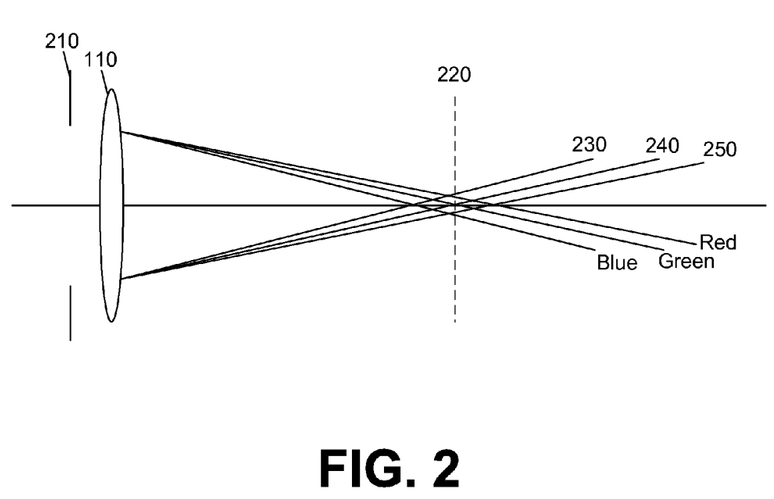
FIG. 2 is a diagram of axial chromatic aberration of an exemplary optical imaging lens of the imaging device in accordance with embodiments of the present disclosure.

Referring now to FIG. 2, the figure shows an axial chromatic aberration of an exemplary optical imaging lens 110 (having diaphragm 210 with lens aperture), when blue wavelengths 230 are focused at the closest distance from the lens 110, green wavelengths 240 are focused at the middle range, and red wavelengths 250 are focused at the furthest distances from the lens 110. Therefore, by moving the lens 110 along the optical axis, different wavelengths are respectively brought in focus at the image plane 220 at different focal distances. Accordingly, when an image is in focus for red wavelengths, the image is out of focus for green and blue wavelengths and vice versa.

Figure 3:
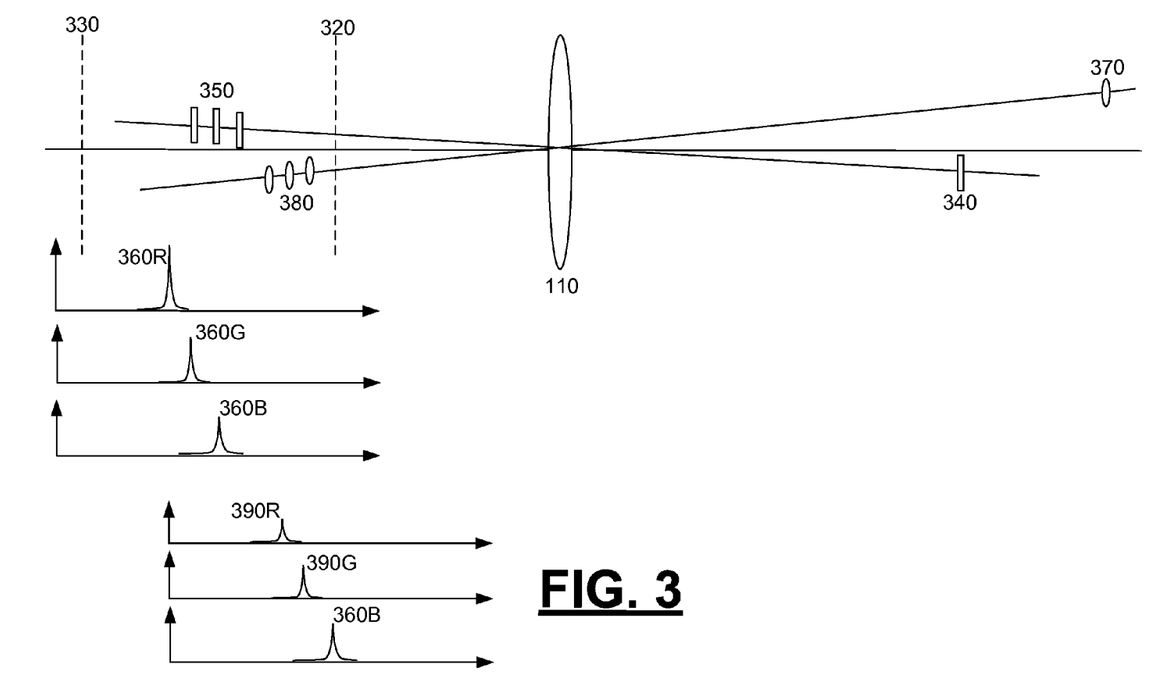
FIG. 3 is a diagram depicting operation principles of the imaging device of FIG. 1 in accordance with embodiments of the present disclosure.

Next, FIG. 3 further illustrates operation principles of an exemplary embodiment of the imaging device 150. The figure depicts chromatic aberration characteristics of an exemplary optical imaging lens 110. Here, plane 320 and plane 330 are limiting image planes, where plane 320 is the plane where the shortest wavelengths of infinitely remote objects will be in focus and plane 330 is the image plane where the longest wavelengths of the closest objects will be in focus. In this example, object 340, produces images at a sub-range of image planes 350. Color signatures 360R, 360B, 360G is depicted for respective red, green, and blue colors corresponding to the pixels arranged in the color array of the image sensor 101.

Correspondingly, an exemplary object 370 produces images 380, and their color signatures 390R, 390G, 390B are depicted. Therefore, in accordance with the present disclosure, multiple images or sub-frames 109A-N may be captured within a defined focus or lens position range to allow for color signatures 360, 390 to be generated for each pixel of the image sensor 101.

Figure 4:
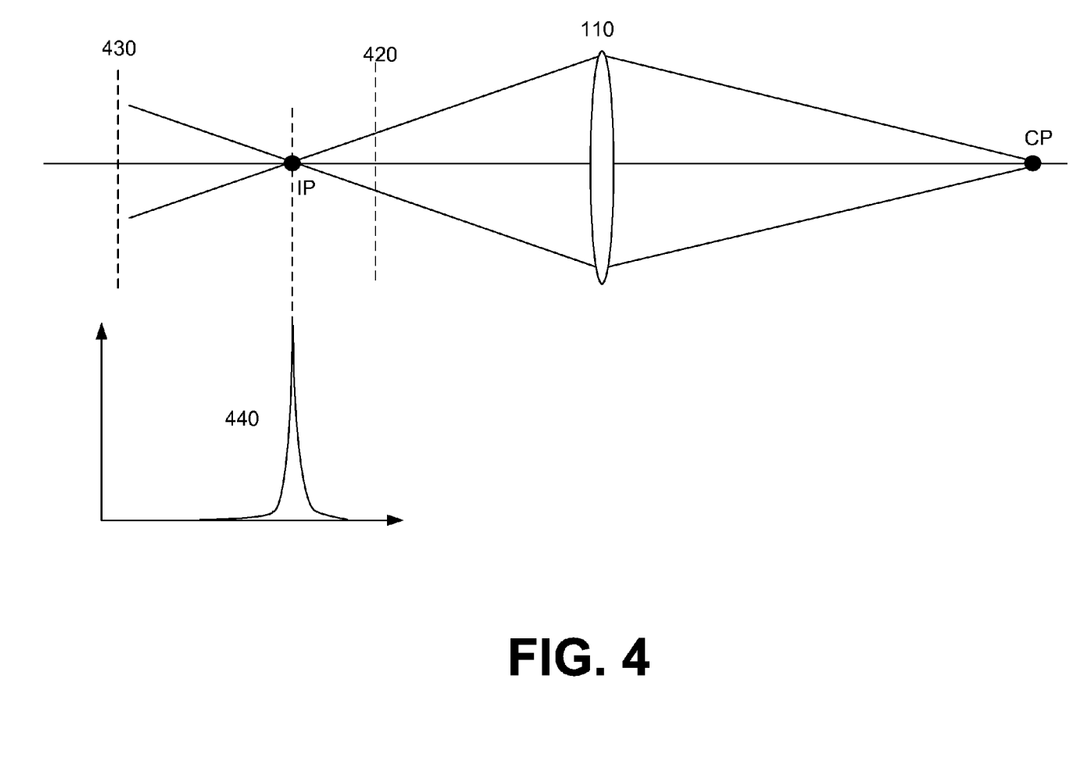
FIG. 4 is a diagram of a spectral response of a single chromatic point as part of an illustration of operation principles of the imaging device of FIG. 1 in accordance with embodiments of the present disclosure.

As an example, FIG. 4 shows the spectral response of a single chromatic point CP, where point CP produces a sharp image IP at a single image plane for a single color pixel, corresponding to its distance from the lens 110 and its wavelength. As the lens 110 is moved within a focus range defined by limits 420 and 430, less sharp or blurry images will be produced. Therefore, a color signature 440 along the moving image plane (or focus range) will have a single sharp peak at a maximum intensity value and then lesser values at focal positions within the focus range (for the single chromatic point in this example).

As a result, from the color signatures 360, 390 for an image pixel, multiple optimal color values (e.g., R, G, B) may be selected from the color signatures 360, 390 corresponding to color wavelength positions within a spectrum, as demonstrated in FIG. 3. As an example, the color component of each of the spectrums 360 is focused at a point that has maximum intensity at the peak of the spectrum. Accordingly, the focus position for each color spectrum of each pixel is dependent upon and may be determined from the corresponding lens positions.

Figure 5:
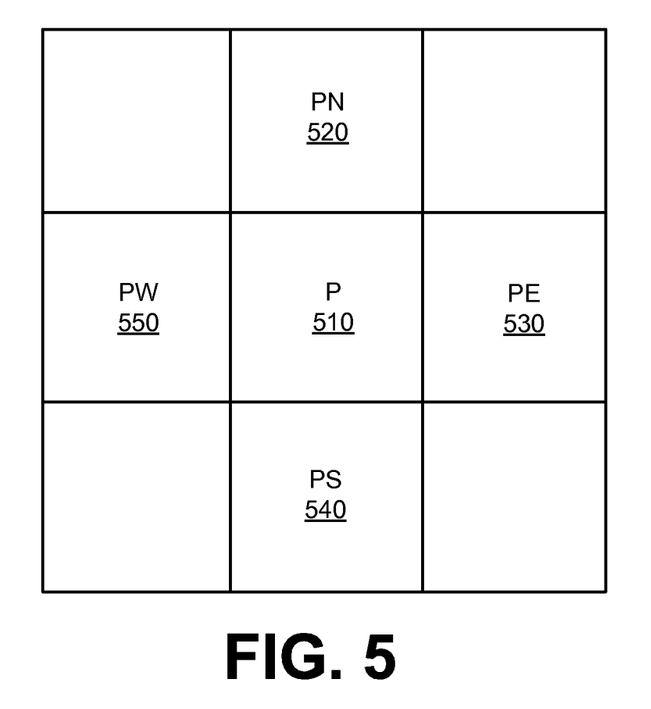
FIG. 5 is a diagram illustrating pixels of an image sensor of the imaging device of FIG. 1 for obtaining focus measures in accordance with embodiments of the present disclosure.

To generate the color signature, focus measures may be computed for an individual pixel across the focus range. For example, FIG. 5 shows a single pixel (P) 510 of the image sensor 101, in an exemplary embodiment. Four neighbors of the pixel are denoted as PN 520, PE 530, PS 540 and PW 550, and an exemplary embodiment of the focus measure at the pixel P at a particular focal distance is the sum of absolute differences of the pixel's value with the values of its four nearest neighbors:

Focus measure at $P=abs(P-((PS+PE+PN+PW)/4))$.

For embodiments using a color mosaic, pixel values may be interpolated after demosaicing algorithms are performed. Accordingly, to determine a blue color signature, blue pixel values may be interpolated using a demosaicing algorithm for the group of pixels (P, PN, PE, PS, and PW) and then applied to the focus measure formula, in one embodiment, among others.

Figure 6:
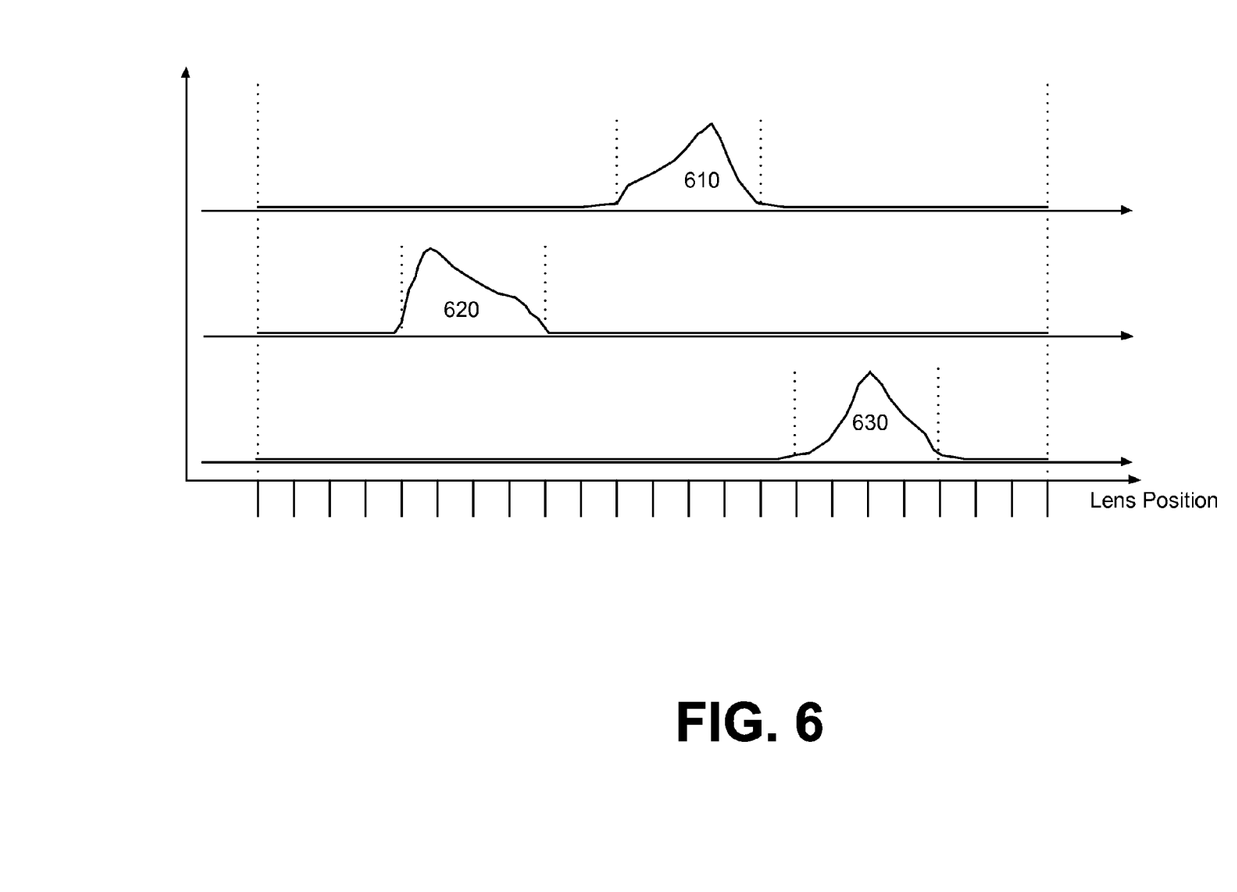
FIG. 6 is a diagram of exemplary focus measures obtained during a lens position sweep of the optical imaging lens of the imaging device of FIG. 1 in accordance with embodiments of the present disclosure.

As understood in the art, focus measures are more adept to identify image quality or sharpness as the level of details and textures in an image scene increase. FIG. 6 shows an example of focus measures calculated and measured at three individual pixels for a specific color wavelength (e.g., red) along a set of the sub-frames captured while sweeping the lens 110. It is noted that a color component for each pixel of the image sensor 101 has a specific color signature (e.g., red color signature). Accordingly, the top plot 610 may be representative of focus measurements across sub-frames for a first pixel of the image sensor 101, the middle plot 620 may be representative of focus measurements across sub-frames for a second pixel of the image sensor 101, and the bottom plot 630 may be representative of focus measurements across sub-frames for a third pixel of the image sensor 101. From the focus measurements, "focused" color component values may be determined for the individual pixels for a specific color (e.g., red) across a range of colors.

Figure 7:
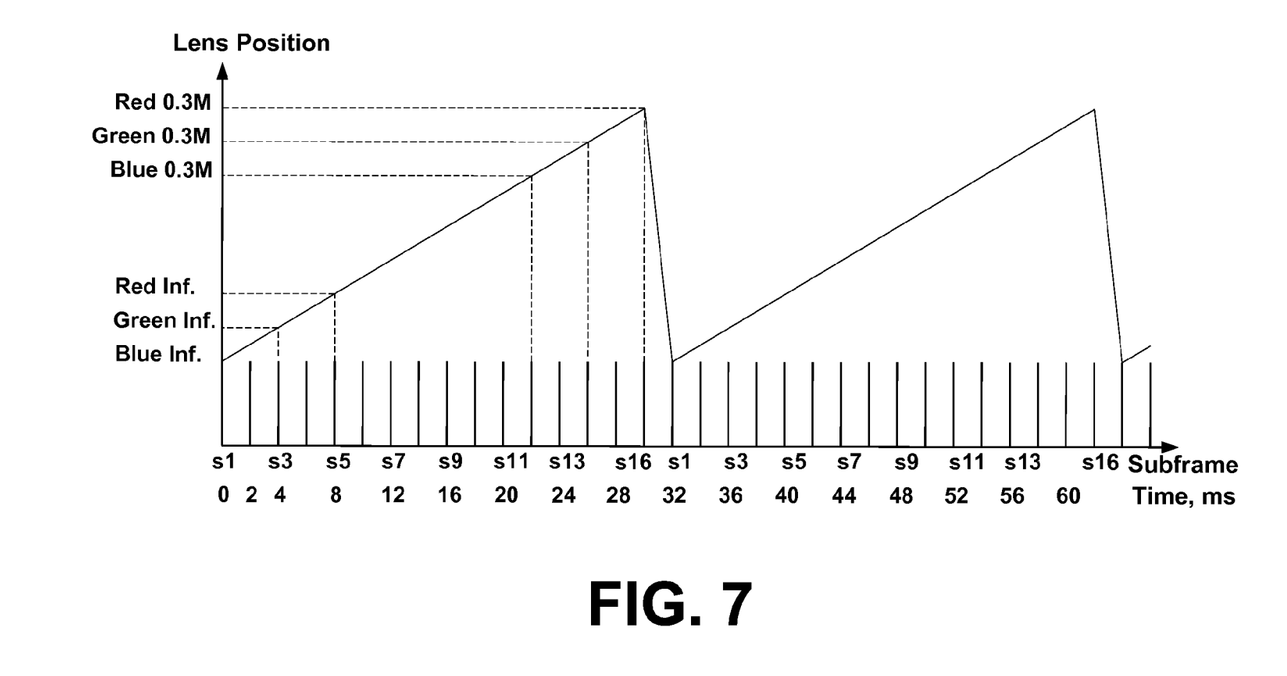
FIG. 7 is a diagram depicting an exemplary time sequence for capturing sub-frames at corresponding lens positions in accordance with embodiments of the present disclosure.

Referring now to FIG. 7, the figure illustrates an exemplary time sequence or series of the sub-frames and corresponding lens positions to help demonstrate how an output frame is formed from the sub-frames, in one embodiment. Here, it is assumed that the duration of each output frame is divided into 16 sub-frames (each having a duration of 2 ms) corresponding to the lens. In different scenarios and/or embodiments, it is understood that frame rate, number of sub-frames in the frame, and sub-frame focal positions may be modified, as should be obvious to one skilled in the art.

In one embodiment, the lens controller 111 moves the lens 110 from a near focal position to a far focal position during acquisition of N sub-frames, and cyclically repeats this movement. In one embodiment, the optical imaging lens 110 is swept within a defined focus range within a time interval of a single output video frame, wherein the sequence of images is captured during the time interval to produce a video stream at a constant output frame rate.

In the example above, the lens 110 sweeps the position range during 16 sub-frames. Therefore, the N sub-frames span the entire focus range and spectral range, and a single output frame 191 (FIG. 1) is formed by output frame ISP 104 from N sub-frames. The sub-frames 109A-N (FIG. 1) are stored in the memory 108, during acquisition of each frame. Then, the sub-frames are read from the memory 108 by output frame ISP 104, and from multiple intermediate sub-frames, a color signature is computed for each color component of each pixel of the image sensor 101 used to acquire the sub-frames 109A-N by the output frame ISP 104. As a result, color values may be calculated and selected for each color component of the pixels from the color signatures such that the selected color components have optimal intensity and are in focus. For example, output frame ISP 104 may generate pixels of three (or more for hyper-spectral images) colors (e.g., red, green, and blue) at all pixel positions. Accordingly, an output image or frame 191 may be generated that includes a full array of pixel data values that corresponds to the images captured by image sensor 101. Therefore, in various embodiments, an index of a sub-frame with the sharpest pixel value, as well as corresponding indices for different color planes together with color dispersion properties of the lens may be used to provide for color and hyper-spectral information. Accordingly, the absolute lens position for focusing a specific color plane and relative lens positions for focusing different color planes can provide enhanced color spectral resolution, beyond the resolution of color mosaic filters.

In various embodiments, the frames are taken from the memory 108 for further processing by applications, permanent storage, displaying, video-output, compression or any other purpose by camera interface 106. The imaging device 150 might have other options and modifications not shown on FIG. 1, obvious to anybody skilled in the art and omitted here for the sake of brevity and/or clarity as less relevant to this disclosure.

Referring back to FIG. 1, sub-frames 109A-N produced by the sub-frame ISP 103 may be provided to the output frame ISP 104 for additional processing prior to being output through the camera interface 106 (e.g., displayed on a display device, output to a storage device, etc.), or sent to the memory 108. The output frame ISP 104 receives the sub-frames 109A-N, either directly from the sub-frame ISP 103 or from memory 108, and may provide for additional processing operations described below in order to produce the output frame 191. The output frame 191 produced by the output frame ISP 104 may then be sent to memory 108 where they may be accessed by the camera interface 106.

Further, in some implementations, an encoder 107, such as a compression engine, etc., may process the output frame 191 prior to it being read by the camera interface 106. The encoder 107 may be a JPEG (Joint Photographic Experts Group) compression engine for encoding still images, an H.264 compression engine for encoding videos, and/or other type of encoder. Also, it should be noted that the camera interface 106 may also receive raw image data from the memory 108.

The control logic 105 may include a processor 1020 (FIG. 10) and/or microcontroller configured to execute one or more routines (e.g., firmware and/or software) that may be configured to determine control parameters for the imaging device 150, as well as control parameters for the output frame ISP 104. By way of example only, the control parameters may include sensor control parameters, camera flash control parameters, lens control parameters (e.g., focal distance for focusing or zoom), or a combination of parameters. The control parameters may also include image processing commands, such as autowhite balance, autofocus, autoexposure, and noise reduction, as well as lens shading correction parameters for the output frame ISP 104.

Next, a general description of the operation of the various components of the imaging device 150 is provided. To begin, an operator of the imaging device 150 selects a mode of operation for the imaging device 150 and initiates the capture of raw image data by the image sensor 101. In one mode, a plurality of raw frames is captured at a different focal position of the lens 110. By taking multiple images sequentially and in rapid succession relative to the speed of the scene, the captured scene will be substantially similar in each image. The focal position of the lens 110 may be controlled by control logic 105. Accordingly, the control logic 105 may cause the lens controller 111 to move the lens 110 continuously through the focus range while the image sensor 101 captures images along the way. In some embodiments, the focus range may be less than the complete focus range of the lens 110 based upon aperture size of the imaging device 150 (controlled by a lens diaphragm) through which light enters and is focused by the lens 110.

Upon receiving the raw image data, the sub-frame ISP 103 may perform one or more image processing operations. The sub-frames 109A-N produced by the sub-frame ISP 103 may then be provided to the output frame ISP 104 for additional processing, including correcting for chromatic aberrations and/or color aliasing present in the captured images and defining corrected pixel values for an output frame 191 or image, prior to being output through the camera interface 106 (e.g., displayed on display device), or to the memory 108. The output frame ISP 104 receives the "front-end" processed data, either directly from the sub-frame ISP 103 or from memory 108, and may perform one or more of several possible operations discussed below.

By taking multiple images sequentially and in rapid succession relative to the speed of the scene, image processing in the output frame ISP 104 may then take the sub-frames 109A-N and generate corrected pixel values based upon color signatures obtained from the sub-frames 109A-N. To this end, the output frame ISP 104 creates an output frame 191 of the scene using the corrected pixel values determined from the color signatures for the array of pixels of the image sensor 110. Focus measures used to construct the color signatures may be evaluated using a sum of absolute differences of a pixel value with its nearest neighbors, Fourier analysis, cosine transforms, edge detection, and/or techniques as can be appreciated. The resulting output frame 191 has improved resolution beyond any one of the individual sub-frames 109A-N. Further, the output frame 191 is corrected for chromatic aberrations and color aliasing while the optical power from a single or simple positive optical lens 110 is maintained, since negative defocus optical lens(es) or optical low-pass filter(s) are not utilized to correct such optical imperfections, in accordance with embodiments of the present disclosure.

As previously mentioned, embodiments of the imaging device 150 may employ modes of operation that are selectable from interface elements of the device. Interface elements may include graphical interface elements selectable from a display or mechanical buttons or switches selectable or switchable from a housing of the imaging device 150. In one embodiment, a user may activate an enhanced mode of operation, where multiple images are captured and used to produce an image with enhanced resolution and color accuracy that may be viewed or saved in memory 108.

Figure 8:
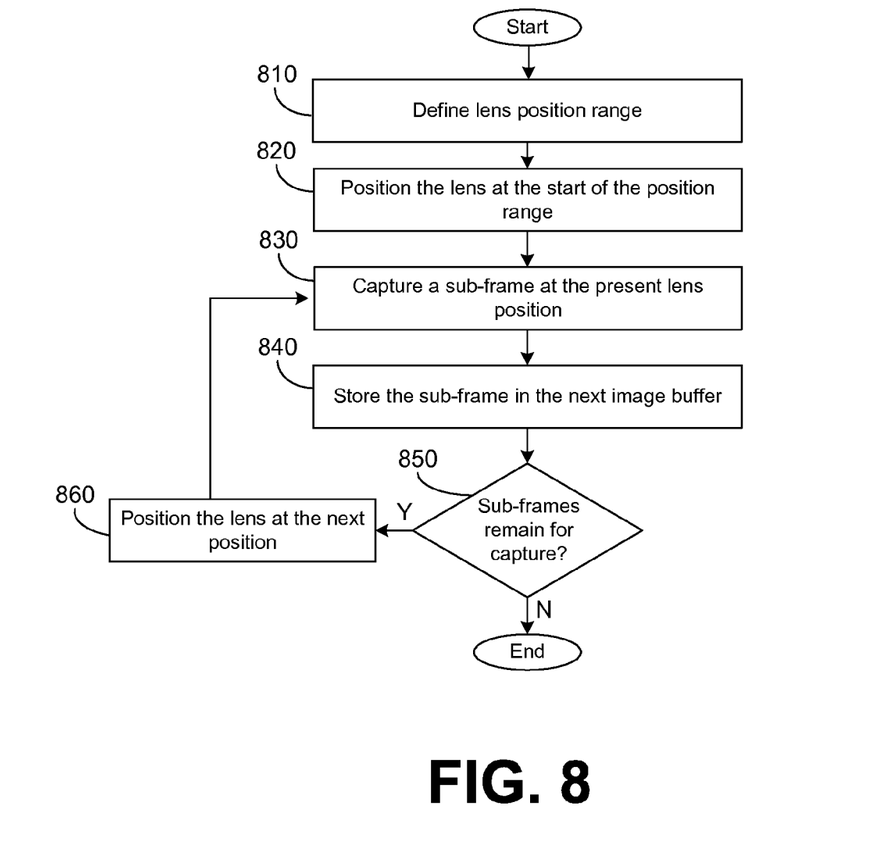
FIGS. 8-9 are flow chart diagrams depicting various functionalities of embodiments of image processing circuitry of FIG. 1.

Referring next to FIG. 8, shown is a flow chart that provides one example of the operation of a portion of the control logic 105 (FIG. 1) according to various embodiments. It is understood that the flow chart of FIG. 8 provides merely an example of the many different types of functional arrangements that may be employed to implement the operation of the portion of the control logic 105 as described herein. As an alternative, the flow chart of FIG. 8 may be viewed as depicting an example of operations or actions of a method implemented in the electronic device 1005 (FIG. 10) according to one or more embodiments.

To begin, the control logic 105 determines (810) a lens position range to be used to capture a sequence or series of sub-frames 109A-N (FIG. 1). The lens position range may be the complete focus range of a lens 110 (FIG. 1) or the range may be limited to a shorter range. As a non-limiting example, using a shorter range may be appropriate if the aperture is large and the depth of focus for the objects in a scene is shallow.

Next, the control logic 105 instructs (820) the lens controller 111 (FIG. 1) to position the lens 110 at the start of the lens position range. Then, the control logic 105 instructs (830) the image sensor 101 (FIG. 1) to capture a sub-frame 109 at the present lens position. Subsequently, the control logic 105 may store (840) the captured sub-frame 109A-N in a memory 108 (FIG. 1). Next, the control logic 105 may determine (850) if further sub-frames 109A-N remain to be capture for a given sequence. If all the sub-frames 109A-N for a sequence has been captured, execution of this portion of the control logic 105 ends as shown.

Alternatively, if additional sub-frames 109A-N remain to be captured, the control logic 105 positions (860) the lens 110 at the next lens position and execution of the control logic 105 returns to block 830. In some embodiments, the lens 110 may continuously move during the capture process. In these embodiments, the control logic 105 may not move the lens into position, but may instead determine the current position of the lens 110.

Figure 9:
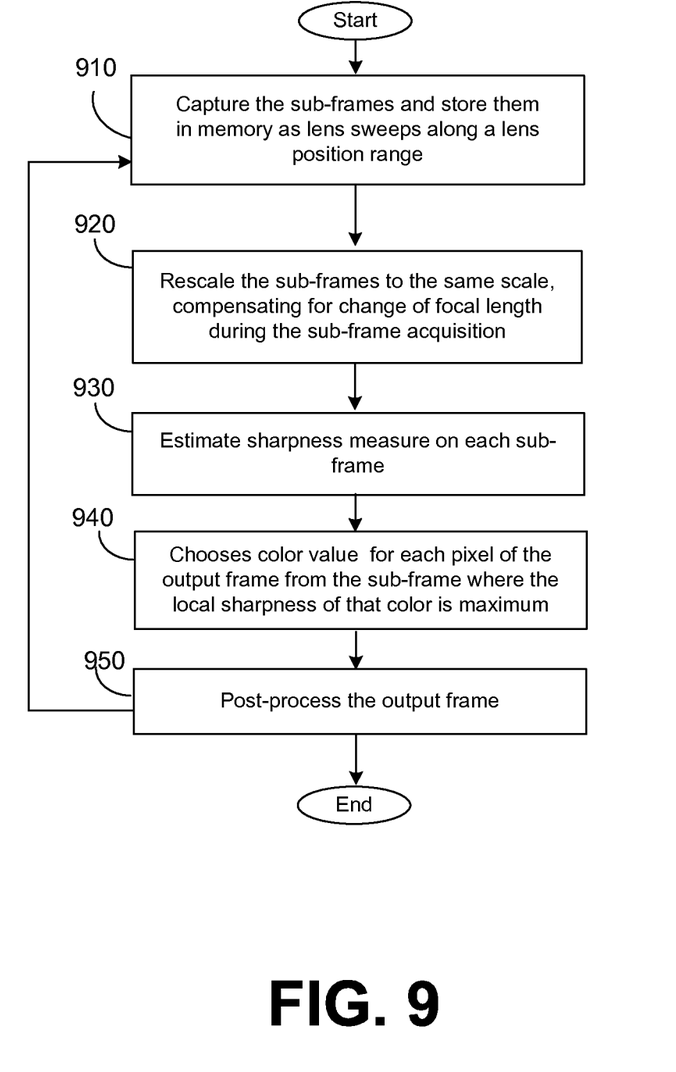

Next, referring to FIG. 9, shown is a flow chart that provides an additional example of the operation of a portion of sub-frame ISP 109 and/or output frame ISP 104 according to various embodiments. To begin, the sub-frame ISP 109 may obtain (910) captured sub-frames 109A-N (FIG. 1) and store the sub-frames in memory 108 (FIG. 1) and/or sub-frame ISP 109 (FIG. 1) as an optical imaging lens 110 is moved or swept along a defined lens position range. After the sweep is finished, the output frame ISP 104 obtains the sub-frames 109A-N (e.g., from memory 108) and rescales (920) them to the same scale compensating to the slight scaling that was caused by change of focus length during the acquisition.

Then, the focus or sharpness measure is evaluated (930) for each pixel of each sub-frame. The sharpness measure can be evaluated as an absolute difference between the pixel value to the average value of its neighbors (as explained in FIG. 5), or by any other procedure, known in the art. The sharpness measure is evaluated separately for the pixels of each color (Red, Green, Blue layers or Yellow, Cyan, Magenta layers), since for each object point, its color layer will be focused on different sub-frames. Then, for each pixel, the color value is taken (940) from the sub-frame where that color has maximum sharpness, corresponding to focused lens position.

Finally, the output frame is obtained (individually or as part of a video sequence), and further image processing is applied (950) to it. In addition to image processing known in the prior art (white balance, automatic exposure, lens-shading correction, edge enhancement, etc.), novel image processing taking advantage of multiple sub-frames can be added, such as denoising from multiple frames, taking information even for not-focused sub-frames for smooth regions of the image, using de-focus as natural optical low-pass filter to disambiguate color-sampling problems of Bayer mosaic (such as effects of color aliasing and false colors along image edges), and other methods as can be appreciated by a person skilled in the art. Knowing the sharp values of the color plane from focused sub-frames without blurring of an optical low pass filter allows for sharper color values to be obtained than in prior art systems, while knowing the blurred color values from the blurred sub-frames allows for eliminating color aliasing effects that are present in prior art systems.

In some embodiments, gain and or exposure times are altered among consecutive sub-frames, and information from several sharpest adjacent sub-frames taken with different exposure is taken to provide a higher dynamic range of the output sub-frame. For example, values of the dark pixels are taken from sub-frames with a higher exposure and gain, while values of bright pixels are taken from the sub-frames with lower exposure and gain. Therefore, multiple sub-frame images are captured sequentially by the image sensor at different exposures and are combined to produce an output frame or image with higher dynamic range than possible with capture of a single image. For instance, capture of an outdoor night time shot with a neon sign might result in either over-exposure of the neon sign or under-exposure of the other portions of the scene. However, capturing both an over-exposed image and an under-exposed image and combining the multiple images can yield a high dynamic range (HDR) image with both adequate exposure for both the sign and the scene.

Further, by identifying portions of a captured scene that are sharpest or optimal from among the sub-frames, a (3D) depth map of the scene may be created in addition to the output frame. Accordingly, in one embodiment, a depth map of an image scene can be extracted, since for every pixel of the image, the lens 110 passed through its sharpest focus position, and this sharpest focus position can be evaluated from relative energy of the sharp contents to the blurred contents. Therefore, in a depth map, the focus image information obtained in post-processing can be positioned at appropriate depths based on the analysis of image information from adjacent frame exposures. In addition to generating the depth map that defines a depth of each pixel in an image, a stereoscopic image (or sequence) may also be generated with pixels in the stereoscopic image being offset in accordance with the depth map. Therefore, the depth map may be used to convert a 2-D image to a 3-D image.

Figure 10:
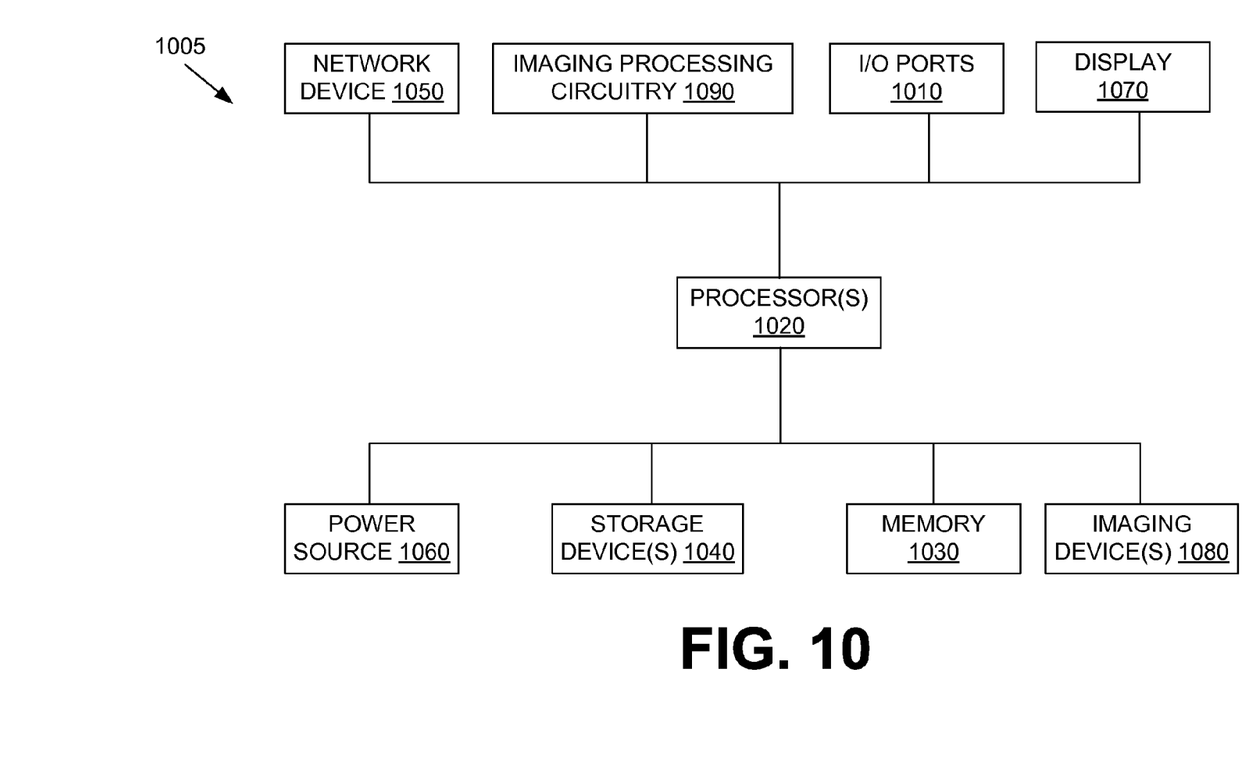
FIG. 10 is a block diagram illustrating an embodiment of an electronic device employing the image processing circuitry of FIG. 1.

Referring to FIG. 10, shown is a block diagram illustrating an example of an electronic device 1005 that may provide for the processing of image data using one or more of the image processing techniques described above. The electronic device 1005 may be any type of electronic device, such as a digital camera, a video camera, a laptop, a desktop computer, a mobile phone, a tablet computer, a digital media player, and/or any device that is configured to receive and process image data, such as data acquired using one or more image sensing components (e.g., image sensor 101).

The electronic device 1005 may include various internal and/or external components which contribute to the function of the device 1005. Those of ordinary skill in the art will appreciate that the various functional blocks shown in FIG. 10 may comprise hardware elements (including circuitry), software elements (including computer code stored on a computer readable medium) or a combination of both hardware and software elements. For example, in the presently illustrated embodiment, the electronic device 1005 may include input/output (I/O) ports 1010, one or more processors 1020, memory device 1030, storage device 1040, networking device 1050, power source 1060, and display 1070. Additionally, the electronic device 1005 may include imaging devices 1080, such as digital cameras or image sensors 101, and image processing circuitry 1090. As will be discussed further below, the image processing circuitry 1090 may be configured to implement one or more of the above-discussed image processing techniques when processing image data. As can be appreciated, image data processed by image processing circuitry 1090 may be retrieved from the memory 1030 and/or the non-volatile storage device(s) 1040, or may be acquired using the imaging device 1080.

It should be understood that the system block diagram of the electronic device 1005 shown in FIG. 10 is intended to be a high-level control diagram depicting various components that may be included in such an electronic device 1005. That is, the connection lines between each individual component shown in FIG. 10 may not necessarily represent paths or directions through which data flows or is transmitted between various components of the electronic device 1005. Indeed, as discussed above, the depicted processor(s) 1020 may, in some embodiments, include multiple processors, such as a main processor (e.g., CPU), and dedicated image and/or video processors. In such embodiments, the processing of image data may be primarily handled by these dedicated processors, thus effectively offloading such tasks from a main processor (CPU). Note that in an embodiment, two or more of image sensor device 101, ND 102 (FIG. 1), and processor(s) 1020 may be included together in a single IC chip, such as a CMOS chip, particularly when image sensor device 101 is a CMOS sensor, or may be in two or more separate chips.

FIG. 11 illustrates the optical advantages of lenses without correction of chromatic aberrations. The figure shows a simple lens 1110, possessing a chromatic aberration and a chromatically corrected lens 1120, known in the art as an achromatic pair. For the achromatic pair 1120, a simple lens 1121, which may be made from low-dispersion crown glass, is combined with an additional negative lens 1122, which may be made from high-dispersion flint glass. The resulting pair 1120 has much lower chromatic aberrations than the simple lens 1121. However, the achromatic pair 1120 also has a longer focal length (in most cases, by at least factor of ×2), and therefore, the pair 1120 has a lower relative aperture (in most cases, by at least factor of ×2), where relative aperture is defined as the ratio between the entrance pupil 1123 to the focal length 1124. This means that the chromatically corrected lens 1120 allows at least less light (in most cases, by at least factor of ×4) to the image sensor 101 or camera, as compared to the simple lens 1110 having the same entrance pupil dimension 1111 and a shorter focal length 1112.

Schematic drawings of the chromatically uncorrected lenses 1110 and 1130 illustrate their advantages over the achromatic lens 1120: Lens 1110 has 2× greater relative aperture and 2× shorter minimal focal length, as compared to achromatic pair 1120. Lens 1130 has the same focal length 1127, as compared to achromatic pair 1120, but has 2× greater relative aperture (as a result of a larger entrance pupil dimension 1126). Note, it is impossible to create a chromatically corrected lens 1120 with the same characteristics as lenses 1110 and 1130, due to the fact that negative lens 1122 decreases the optical power of positive lens 1121 and therefore increases the focal length. Therefore, to produce the achromatic pair equivalent to lenses 1110 and 1130, positive lens 1121 of prohibitively large thickness or un-exactingly large refraction coefficient would be needed. If such a positive lens would be produced somehow, removing the negative lens 1122 would once again produce a chromatically uncorrected lens of far superior properties.

Any process descriptions or blocks in flow charts should be understood as representing modules, segments, or portions of code which include one or more executable instructions for implementing specific logical functions or actions in the process, and alternate implementations are included within the scope of embodiments of the present disclosure in which functions may be executed out of order from that shown or discussed, including substantially concurrently or in reverse order, depending on the functionality involved, as would be understood by those reasonably skilled in the art.

In the context of this document, a "computer readable medium" can be any means that can contain, store, communicate, or transport the program for use by or in connection with the instruction execution system, apparatus, or device. The computer readable medium can be, for example but not limited to, an electronic, magnetic, optical, electromagnetic, infrared, or semiconductor system, apparatus, or device. More specific examples (a non-exhaustive list) of the computer readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). In addition, the scope of certain embodiments includes embodying the functionality of the embodiments in logic embodied in hardware or software-configured mediums.

It should be emphasized that the above-described embodiments are merely possible examples of implementations, merely set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, having thus described embodiments of the invention, at least the following is claimed:

1. An imaging device, comprising:
    an optical imaging lens having chromatic aberration, the optical imaging lens positioned at different focal positions for different wavelengths;
    an image sensor having an array of pixels and a color filter mosaic, the image sensor configured to receive light transmitted from the optical imaging lens; and
    a lens controller configured to change a focal position of the optical imaging lens to acquire a sequence of sub-frame images at the different focal positions and, for each pixel of the array of pixels, one sub-frame image from the sequence of sub-frame images, for which the one sub-frame image generates a maximum sharpness value relative to other sub-frame images in the sequence of sub-frame images, being selected to form a corresponding pixel of an output frame image.

2. The imaging device of claim 1, further comprising:
    an image processor configured to:
        rescale the sequence of sub-frame images to a common scale;
        determine a focus measure for each color component of each image pixel of the output frame image based on the rescaled sequence of sub-frame images;
        for each color component of each image pixel in the output frame image, determine a sub-frame image on which the focus measure of an image pixel in the output frame image reaches a maximum value among the sub-frame images, the maximum sharpness value relating to the focus measure at the maximum value; and
        generate the output frame image using sub-frame images having a color component with the focus measure at the maximum value for each image pixel of the output frame image.

3. The imaging device of claim 2, wherein for each color component of each image pixel of the output frame image, a true sub-frame image is
    determined based on an index of the sub-frame image with the focus measure that reaches the maximum value, wherein a value is chosen for a color component from the true sub-frame image.

4. The imaging device of claim 2, wherein image pixel values from unfocused sub-frame images are taken into account in a demosaicing process for the image sensor, thereby providing a natural low-pass filtering to color components of image pixels in order to eliminate effects of color aliasing and false colors along image edges.

5. The imaging device of claim 2, wherein image pixel values from blurred sub-frame images are taken into account to de-noise smooth regions of the output frame image.

6. The imaging device of claim 2, wherein exposure time is altered among consecutive sub-frame images, and image pixel information from several sharpest adjacent sub-frame images taken with different exposures is taken to provide a higher dynamic range of the output frame image.

7. The imaging device of claim 2, where an index of a sub-frame image with a sharpest pixel value and a corresponding lens position during acquisition of that sub-frame image are used to provide distance information to a corresponding image pixel and to generate a depth map of a captured scene.

8. The imaging device of claim 2, wherein sub-frame images are determined for which focus measures of hyperspectral components of an image pixel reach a maximum value among the sub-frame images in addition to the color components of the image pixel.

9. The imaging device of claim 2, wherein the focus measure comprises computing an absolute difference of an image pixel color component value with an average value of its nearest color component neighbors.

10. The imaging device of claim 1, further comprising:
an image processor configured to form a single output frame image from multiple input sub-frame images, wherein:
multiple sub-frame images are acquired at the different lens focal positions while the optical imaging lens is swept within a range of lens focal positions;
for each color component of each image pixel in the single output frame image, a set of the input sub-frame images is found in which a particular color component of the image pixel has an optimal sharpness or focus measure; and
from the lens positions corresponding to set of sub-frame images, a color signature, color component value, and object distance are determined for each color component of each image pixel of the single output frame image.

11. The imaging device of claim 10, wherein the image processor is further configured to generate a video based upon a temporal sequence of frames comprising the single output frame image.

12. The imaging device of claim 1, wherein the optical imaging lens is swept within a defined focus range within a time interval of a single output video frame, wherein the sequence of sub-frame images is captured during the time interval to produce a video stream at a constant output frame rate.

13. A method, comprising:
capturing a plurality of sub-frame images based on an optical lens positioned at different positions along a lens position range;
rescaling the plurality of sub-frame images to a common scale;
estimating a sharpness measure of a color component of each image pixel based on the rescaled plurality of sub-frame images;
determining a color value for each image pixel of an output frame image from the captured sub-frame images where the sharpness measure for the color value in the image pixel is at a maximum value amongst the plurality of sub-frame images; and
outputting the output frame image.

14. The method of claim 13, wherein the sharpness measure comprises computing an absolute difference of an image pixel color component value with an average value of its nearest color component neighbors.

15. The method of claim 13, further comprising generating a video based upon a temporal sequence of frames comprising the output frame image.

16. The method of claim 13, wherein a particular corrected color component value is identified by measuring a sharpness measure of a color component of an image pixel amongst different lens focal positions and selecting the particular corrected color component value that corresponds to an optimum sharpness value measured.

17. A non-transitory computer readable medium having a computer program executable by a hardware processor of an imaging device, the computer program comprising:
code that causes an image sensor having a color filter mosaic to capture a plurality of sub-frame images, wherein each sub-frame image of the plurality of sub-frames images comprises a representation of an object captured at a focal position of an optical lens having chromatic aberrations, the focal position being different for each sub-frame image of the plurality of sub-frames images;
code that generates a color signature for each color component of each image pixel of a single output frame image based on one sub-frame image selected from the plurality of sub-frame images for each image pixel; and
code that defines a corrected color component value to represent a color component of the image pixel based on the color signature generated.

18. The non-transitory computer readable medium of claim 17, further comprising code that defines a focus range in which to acquire the sub-frame images, wherein the optical lens is moved across the focus range during capture of the sub-frame images.

19. The non-transitory computer readable medium of claim 17, wherein the color signature is generated from focus measures applied to the plurality of sub-frame images.

20. The non-transitory computer readable medium of claim 17, further comprising code that generates the single output frame image of the object from a sequence of the plurality of sub-frame images acquired at different lens focal positions and from corrected color component values defined for each image pixel of the single output frame image.

* * * * *